United States Patent [19]

Raj

[11] Patent Number: 5,008,661

[45] Date of Patent: Apr. 16, 1991

[54] ELECTRONIC REMOTE CHEMICAL IDENTIFICATION SYSTEM

[76] Inventor: Phani K. Raj, 2 Kitson Park Dr., Lexington, Mass. 02173

[21] Appl. No.: 293,505

[22] Filed: Jan. 4, 1989

Related U.S. Application Data

[63] Continuation-in-part of Ser. No. 780,938, Sep. 27, 1985, abandoned.

[51] Int. Cl.[5] .......................... H04Q 7/00; H04Q 3/70

[52] U.S. Cl. .......................... 340/825.54; 340/825.34; 340/825.69; 340/825.55

[58] Field of Search ....................... 340/825.54, 825.55, 340/825.34, 825.69, 825.71, 825.72, 825.31; 235/384, 385

[56] References Cited

U.S. PATENT DOCUMENTS

| | | | |
|---|---|---|---|
| 3,377,616 | 4/1968 | Auer, Jr. | 340/825.54 |
| 4,398,172 | 8/1983 | Carroll et al. | 340/825.54 X |
| 4,714,925 | 12/1987 | Barlett | 340/825.55 |
| 4,724,427 | 2/1988 | Carroll | 340/825.54 X |
| 4,742,470 | 5/1988 | Juengel | 340/825.54 X |

*Primary Examiner*—Benedict V. Safourek
*Assistant Examiner*—Ralph E. Smith
*Attorney, Agent, or Firm*—Dennis L. Kreps

[57] ABSTRACT

An electronic remote chemical identification system is described, in which a transponder for recording information regarding the contents and other information of a railroad tank car, highway tank truck or other container is placed thereon, the transponder being coded remotely with the information by a remotely located, fixed or portable encoder and interrogated when desired by a remotely located, fixed or portable interrogator unit. In the case of an accident, emergency and other response personnel can utilize the interrogator to query a single or a plurality of transponders on the tank cars in the train or on the tank truck to safely and immediately ascertain the exact contents of the containers and other associated information regarding the shipper, the origin and destination of the consignment, shipper's emergency personnel telephone number and proper response action to be taken at the accident scene, etc. Similarly, the system can be used in normal commerce to inventory the contents of a passing freight train, a train in a yard or a road truck.

11 Claims, 18 Drawing Sheets

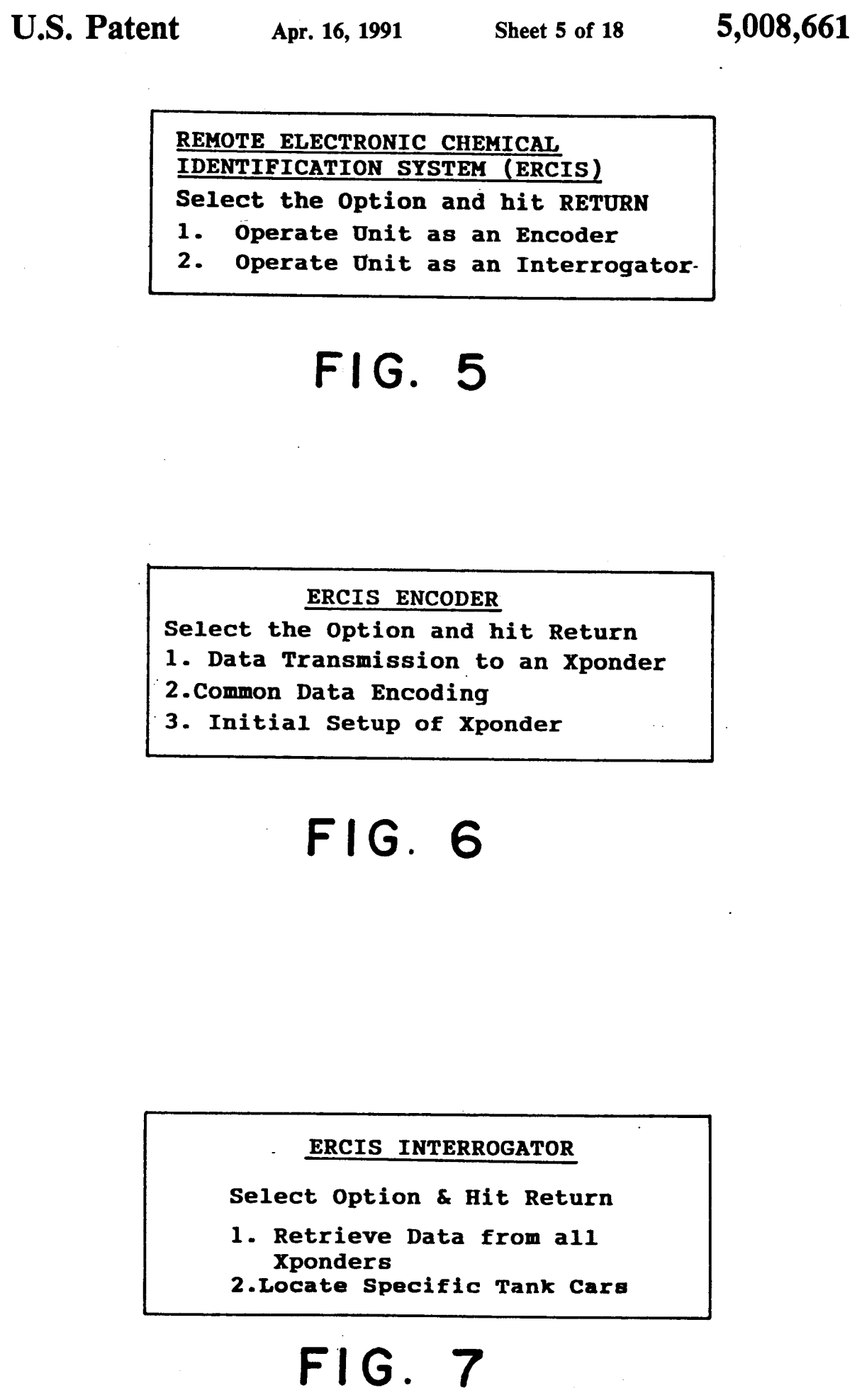

REMOTE ELECTRONIC CHEMICAL IDENTIFICATION SYSTEM (ERCIS)

Select the Option and hit RETURN

1. Operate Unit as an Encoder
2. Operate Unit as an Interrogator

FIG. 5

ERCIS ENCODER

Select the Option and hit Return

1. Data Transmission to an Xponder
2. Common Data Encoding
3. Initial Setup of Xponder

FIG. 6

ERCIS INTERROGATOR

Select Option & Hit Return

1. Retrieve Data from all Xponders
2. Locate Specific Tank Cars

FIG. 7

1. US DOT/UN Number of Chemical
2. Chemical STCC Number
3. Hazard Class of Chemical
4. Tank Car is Loaded or Empty
5. Shipper's Name
6. Emergency Telephone Number of Shipper
7. Shipper's Address (3 lines)
8. Loading Terminal (Alphanumeric) Code
9. Destination of Car Shipment
10. Name of Supervisor (Who codes common data information)
11. Name of Foreman at Loading Dock or his ID #
12. Date
13. Time at Which Transponder is Coded
14. Serial # of Encoder
15. Instructional Memo

FIG. 8

| REC. NO. | NAME OF THE CHEMICAL | HAZARD CLASS | US DOT/UN NO. | STCC NO. | US DOT GUIDE NO. | SHIPPING STATE | RANK BY VOL. |
|---|---|---|---|---|---|---|---|
| 1. | ACETALDEHYDE | FL | 1089 | 4907210 | 26 | L | 41 |
| 2. | ACETIC ACID, GLACIAL | CM | 2789 | 4931303 | 29 | L | 43 |
| 3. | ACETIC ANHYDRIDE | CM | 1715 | 4931304 | 39 | S | 69 |
| 4. | ACETONE | FL | 1090 | 4908105 | 26 | L | 63 |
| 5. | ACRYLIC ACID | CM | 2218 | 4931405 | 29 | L | 91 |
| 6. | ACRYLONITRILE | FL | 1093 | 4906420 | 30 | L | 38 |
| 7. | ALCOHOL, N.O.S. | CL | 1986 | 4913158 | 28 | L | 70 |
| 8. | ALCOHOL, N.O.S. | CL | 1986 | 4913103 | 28 | L | 99 |
| 9. | ALCOHOL, N.O.S. | FL | 1987 | 4909110 | 26 | L | 56 |
| 10. | ALCOHOL, N.O.S. | FL | 1987 | 4909105 | 28 | L | 100 |
| 11. | ALCOHOLIC BEVERAGE | FL | 1170 | 4910309 | 26 | L | 118 |
| 12. | ALKALINE FLUID | CM | 1719 | 4935220 | 60 | L | 76 |
| 13. | AMMONIUM NITRATE, SOLUTION | OM | 1942 | 4918774 | 43 | L | 68 |
| 14. | ANHYDROUS AMMONIA | NG | 1005 | 4904210 | 15 | CG | 4 |
| 15. | ANILINE OIL, LIQUID | PB | 2547 | 4921410 | 57 | L | 103 |
| 16. | ARGON, REFRIGERATED LIQUID | NG | 1951 | 4904503 | 21 | CG | 122 |
| 17. | ASPHALT, CUT-BACK | CL | 1999 | 4915320 | 27 | L | 112 |
| 18. | BENZENE | FL | 1115 | 4908110 | 26 | L | 37 |
| 19. | BUTADIENE | FG | 1010 | 4905704 | 17 | CG | 24 |
| 20. | BUTADIENE, INHIBITED | FG | 1010 | 4905703 | 17 | CG | 113 |
| 21. | BUTANE | FG | 1011 | 4905706 | 22 | CG | 15 |
| 22. | BUTANE | FG | 1011 | 4905702 | 22 | CG | 12 |
| 23. | BUTYL ACETATE | FL | 1123 | 4909128 | 26 | L | 110 |
| 24. | BUTYL ALCOHOL | FL | 1120 | 4909219 | 26 | L | 85 |
| 25. | BUTYL ALCOHOL | FL | 1120 | 4909131 | 26 | L | 109 |
| 26. | BUTYL ALCOHOL | FL | 1120 | 4909117 | 26 | L | 96 |
| 27. | BUTRALDEHYDE | FL | 2045 | 4908119 | 26 | L | 94 |
| 28. | CARBON BISULFIDE | FL | 1131 | 4908125 | 28 | L | 75 |
| 29. | CARBON DIOXIDE, LIQUID | NG | 2187 | 4904509 | 21 | L | 18 |
| 30. | CARBON TETRACHLORIDE | OA | 1846 | 4940320 | 55 | L | 74 |

FIG. 10

| COMMAND CHARACTER | Executable Action and String Format |
|---|---|
| $ | Specified transponder RECEIVE DATA from encoder.<br>FORMAT /$;TankCar No;Item Type;Item String;<CR>;CRC;! |
| # | Specified transponder TRANSMIT requested DATA to encoder.<br>FORMAT /#;TankCar No;Item Type;Item String;<CR>;CRC;! |
| % | Transponder with serial number (SN) in the range specified TRANSMIT the tankcar number.<br>FORMAT /%;TankCar No;Item Type;Item String;<CR>;CRC;! |
| & | Transponders with specified chemical hazard class (HC), TRANSMIT the respective tank car numbers.<br>FORMAT /&;HC;<CR>;CRC;! |
| @ | Transponders with specified hazard class (HC) and with serial numbers (SN) in the specified range TRANSMIT the respective tank car numbers.<br>FORMAT /@;HC;SN Low Limit;SN High Limit;<CR>;CRC;! |
| * | Transponders with specified chemical STCC numbers TRANSMIT tank car numbers.<br>FORMAT /*;STCC Number;<CR>;CRC;! |
| ? | Transponder with specified tank car number TRANSMIT, chemical hazard class (HC) and STCC Number of chemical.<br>FORMAT /?;Tank Car number;<CR>;CRC;! |
| } | Transponder with specified tank car number SHUT DOWN transmitter until re commanded to wake up.<br>FORMAT /};Tank car number;<CR>;CRC;! |
| { | Transponder with specified tank car number WAKE UP.<br>FORMAT /{;Tank car number;<CR>;CRC;! |

FIG. 12

CHARACTER CODES FOR DATA TYPES

| | |
|---|---|
| A | Tank car number |
| B | Shipper's Name |
| C | Shipper's Address Chemical |
| D | Emergency Telephone Number |
| E | Chemical Loading Terminal Code |
| F | Supervisor's Name |
| G | Instructional Memo |
| H | Chemical STCC number |
| I | Hazard Class of the Chemical |
| J | A Flag to indicate the tank car is empty (0) or full (1) |
| K | Destination of shipment |
| L | Chemical loading formean's name or ID number. |

FIG. 12 (cont.)

| CLASS RANK | HAZARD CLASS | CODE |
|---|---|---|
| 1. | Radioactive Materials | RAM |
| 2. | Poison A | PA |
| 3. | Flammable Gas | FG |
| 4. | Non-flammable Gas | NG |
| 5. | Flammable Liquid | FL |
| 6. | Oxidizer | OX |
| 7. | Flammable Solid | FS |
| 8. | Corrosive Material | CM |
| 9. | Poison B | PB |
| 10. | Irritating Materials | IM |
| 11. | Combustible Liquid | CL |
| 12. | Other Regulated Materials B | OB |
| 13. | Other Regulated Materials A | OA |
| 14. | Other Regulated Materials E | OE |

FIG. 15

ELECTRONIC REMOTE CHEMICAL IDENTIFICATION SYSTEM

This application is a continuation-in-part of my earlier application Ser. No. 06/780,938 filed Sept. 27, 1985, now abandoned.

BACKGROUND OF THE INVENTION

1. Field of the Invention

There have been several major transportation accidents in the United States involving the release of hazardous chemicals, followed by spectacular fires and explosions, dispersion of toxic vapors, extensive property damage and potential ground water pollution. In many of these incidents, there have been injuries to people and/or loss of human life. Property and environmental damage have been estimated in the hundreds of millions of dollars. Many of these catastrophes have involved railroad tank cars and tractor-trailer tank trucks transporting hazardous chemicals. The transportation of hazardous chemicals in the United States on railroads, roads, highways and waterways is regulated by various agencies of the U.S. Department of Transportation, as well as by state and local bodies. These agencies have instituted numerous regulations to reduce accident frequency, severity and public impact of hazardous chemical releases. These regulations stipulate technological modifications as well as operations and management changes in the transportation of hazardous chemicals to provide safety to the public. For example, one regulation requires the carrying of bills of lading or waybills identifying the chemicals being transported. The railroads, for example, have become conscious of potential public hazards and economic costs resulting from accidental chemical releases, and have undertaken changes in operational procedures, development of contingency plans, and have instituted emergency response management procedures to cope with hazardous materials accidents. Truck fleet operators also are considering various operational measures to reduce tractor-trailer accidents involving chemicals.

Unfortunately, major transportation accidents involving hazardous chemicals continue to occur. One of the major problems associated with railroad accidents involving hazardous materials in tank cars (and the consequent release of their contents) is the proper identification of the various chemicals being transported. The National Transportation Safety Board and the National Fire Protection Association have repeatedly pointed out that emergency response personnel need immediate and accurate information concerning the hazardous or other materials involved, and guidance in the handling of transportation emergencies (involving hazardous materials).

The National Transportation Safety Board (NTSB) has pointed out repeatedly in many of its accident investigation reports how the timely determination and initiation of proper response action could have saved lives and property damages. For example, in the report NTSB-RAR-79-1 the Board notes that "Fire fighters experienced a forty-five minute delay in obtaining the waybills and consist information with pertinent hazardous materials emergency information. This delay could have had serious consequences, particularly if they had attempted to fight the fire before the second explosion. Fire fighters should have known immediately where to find the train's hazardous materials information. Also, if the crew members had been injured, a longer delay in obtaining the information would have occurred. If the crew members had been killed or injured, there was no identified location where the consist information could be obtained from."

In 1979, following a train derailment in Mississaga, Canada, the lack of identification of the leaking chemicals for over eight hours led to considerable confusion as to the proper emergency response actions to be taken. Finally, after the chemical was identified as chlorine, over 250,000 people were evacuated—the largest evacuation due to a hazardous materials incident in North America.

The initiation of emergency action in evacuation of inhabitants from potential hazard zones surrounding a train derailment involving several chemical cars in Livingston, La. in 1981 was also delayed by several hours, to almost a day, because of the inability of emergency personnel to identify the chemicals in the derailed cars. Placards attached to the cars identifying their contents were lost, and the car sequences were jumbled as a result of the accident, making identification of contents extremely difficult, even though the way bill for the train was available. There have been several other such incidents involving highway and road trucks in which the single major problem in initiating an emergency response by the first responders on the scene has always been the lack of knowledge of the contents of the damaged vehicles.

2. Description of the Prior Art

Many techniques are available to identify tank cars/tank trucks and their contents. Almost all of these methods are passive in that the information regarding the tank car or its contents is either fixed or cannot be changed easily. Some of these methods include placarding of the tanker contents, bar codes on the tank cars, color coding of tank cars, etc. In the U.S. all bulk containers in transportation containing hazardous materials are required by U. S. Department of Transportation regulations (49 CFR, part 175) to display placards. The placards contain a four digit number (US DOT number or the United Nations number), and have in general symbols in color representing the class of chemicals being transported. Placards and other passive cargo identification techniques have several serious limitations. These include, (i) the information content on the "devices" are either permanent or cannot be changed easily, (ii) the reading of the information can be done only at close range and only when the device is visible, (iii) very limited information can be displayed, (iv) the information on the devices is susceptible to being erased or damaged due to weathering action, chemical spills, and deliberate tampering by third parties,(v) nonuniformity in international conventions on placarding or bar coding, (vi) the "open" nature of the placarding system which allows mischievous elements in society to easily identify highly toxic, dangerous or explosive chemicals being transported through populous areas, which knowledge could be potentially used for criminal acts of violence or to endanger the lives of large numbers of the civilian population. In the case of absence of placards or their loss in accidents the only other method currently available to first responders is to identify the various chemicals in the train or on the tank truck by obtaining the shipping papers (when available) and reading them or to guess the chemical contents from the size and shape of the containers.

Active techniques of chemical identification available at present are useful only if the chemical has been released. These techniques are used for determining the concentration of the chemical in the atmosphere, rather than for strict identification. Most methods used in accident situations rely on remote sensing technologies which utilize electromagnetic radiation in one form or another. Typically, the interaction between the particular chemical in the atmosphere and the radiation emitted by a sensor in the infrared, visible or ultraviolet region of the spectrum is sensed. Identification principles are based on absorption, emission or scattering of spectral characteristics of the radiation. Many systems developed for air pollution studies use laser beams as sources of high intensity coherent radiation.

Other types of identification systems have been described in the literature and in several patent applications for use in commercial and industrial applications for detecting either personnel, objects or transport vehicles. These systems are based on different techniques of data storage (passive cards, magnetic memories, electronic chips), and use different technologies for data communication and detection (light energy, infra red beams, radio frequency signals, etc).

J. H. Auer, Jr., (U.S. Pat. No. 3,377,616), describes a system for communicating information between a moving vehicle and a stationary, way-side receiver. Each vehicle is provided with a transducer device including a suitable transmitting apparatus and a means of extracting energy from the wayside energy source. The transducer is a collection of photoelectric cells each of which is activated according to a pre-determined order by the cutting of a light beam by punched card with holes arranged in particular order to convey one piece of information. As the vehicle passes the wayside energy source, in this case a light beam, the transducer generates a response signal coded in some predetermined manner in accordance with the particular information to be conveyed by each vehicle to a suitable receiving apparatus at the wayside location. This invention is different in principle, range of operation and quantity of information on the transducer. Since the energy source for the operation of the transponder has to come from the light beam, it is essential that for the proper operation of Auer's invention there be (i) relative motion between the vehicle and the wayside device, (ii) the distance between the transponder and the wayside device be very short, of the order of a few feet, and (iii) the transponder "see" the beam. Also, the wayside device has no intelligence and cannot query individual vehicle transponders, nor can it distinguish an individual vehicle transponder and communicate with it on a one-to- one basis in the midst of several other vehicles. The information content on the vehicle units cannot be changed remotely, nor can the change be made easily. The invention of Auer, Jr. is therefore considerably different from the subject invention.

Carroll, et al., (U.S. Pat. No. 4,398,172), describes a vehicle monitor apparatus system for identifying vehicles as they enter a parking lot or a rental car facility. Each vehicle carries an infrared transponder which continuously transmits in the infrared range data on the various parameters related to the vehicle condition. As the vehicle enters a facility, a ground station monitors the transmission from the vehicle transponder and stores the data for print out and other operations. Because of the use of infrared as the transmitting medium, the system is limited to short range, line-of-sight operation only and is susceptible to considerable errors due to humidity and dust, and especially if hot objects are involved. Also, the ground station has no way of manipulating the responses of the transponder on the vehicle because of one way communication. Carrol, et al, refer to the U.S. Pat. No. 4,207,468 of Wilson in which a two way infrared communication between the ground station and the vehicle transponder is disclosed. However, even in Wilson's patent the ground station only turns on and turns off the vehicle transponder, but cannot materially alter the information sent out by the transponder depending on the questions posed by the ground station. In addition, the systems proposed by Carroll, et al., and Wilson do not lend themselves to reprogramming of the "memory" of the vehicle transponder every time the contents of the vehicle changes. These systems cannot be used to identify simultaneously a multitude of cars.

Lennington (U.S. Pat. 4,325,146) and Chiapetti (U.S. Pat. No. 4,338,587) describe other types of vehicle identification systems. Lennington's invention is similar to that of Carroll, et al and is primarily used for allowing a vehicle to pass through a gate depending on the appropriate code stored in the vehicle transponder. Chiapetti's invention is applicable to identifying a vehicle travelling along a lane, such as a highway, for the purposes of collecting tolls, etc. In the Lennington system, a stationary interrogator at the entrance to an area emits optical pulses to activate the transponder on the vehicle approaching the area. Upon such activation, the transponder emits a unique code in the form of optical pulses in accordance with a program stored in its memory. The interrogator then decodes the information and supplies the data to peripheral equipment for checking the authenticity of the vehicle. Chiapetti uses similar principles, except that radio communication is utilized rather than an optical medium as in Carroll, et al, Lennington, and Wilson. None of the above art can deal with identifying vehicles or contents in ensembles of vehicles nor can this art determine the location of a specific vehicle in the ensemble.

Denne and Hook (U.S. Pat. No. 4,691,202) disclose an identification system comprising an interrogator which transmits to a plurality of transponders each of which is arranged automatically to reply by means of a first coded identification signal stored in the transponder memory. The range of operation of the system is limited to about 1 meter. The addressing of each of the transponders is achieved by the unique identification code for each transponder. Very similar techniques of encoding information onto a carrier wave for transmission have been described by Twardowski (U.S. Pat. No. 4,535,333), Walton (U.S. Pat. No. 4,656,472) and Sigrimis, et al., (U.S. Pat. No. 4,510,495). Except for Denne & Hook, the other art is not applicable to communication between and identification of a plurality of transponders. In Denne and Hook, it is essential to know a priori the particular identification signal for each transponder being addressed. Also none of the prior art is suitable for identifying the direction and location of a single unit among an ensemble of units. This need to identify the tank cars and their contents and the pinpointing the direction and location of a specific, user-specified car carrying a dangerous cargo in a jumble of cars occurs when a freight train containing hazardous cargo tank cars derails subsequent to which the cars are lying in all orientations, directions and order.

SUMMARY OF THE INVENTION

The key questions facing the first responders and emergency workers at the scene of a hazardous materials transportation accident involving a highway tank truck or multiple rail tank car derailment and a chemical spill are: (1) What are the chemicals? (2) are they hazardous, poisonous, toxic, explosive or corrosive?, and (3) where is a particular car containing a particular (perhaps, a very hazardous) chemical located in the jumble of cars? The rapidity and correctness of response, including any evacuations of local population and chemical spill neutralizing techniques to be initiated at the scene, will depend very crucially on the proper identification of the chemicals, knowledge of their physical and chemical properties, and their behavior in the environment. It is because of this that many accident investigators have recognized that reliable chemical identification in accidents is the first and foremost step, and that there is an urgent need to develop technologies to do this. The National Transportation Safety Board has repeatedly recommended that both regulatory agencies and other institutions support research efforts for chemical identification and for improving recording procedures regarding the consists in a train or truck transporting hazardous materials. Therefore, there is the need for a system which will identify the chemical contents in transportation containers from sufficiently far off and safe distances and locate particular container in an ensemble of containers.

The subject invention relates to a chemical identification system useful for determining the contents of the railroad tank cars or highway tank trucks from a safe and remote location so that the first responders are not subject to potential hazards from leaking chemicals in an accident. The system consists of units programmable to store in their erasable memory important information. These units are referred to as transponders. The system further consists of units which may be hand held or fixed into which the desired information is entered through a keyboard (or such other data input device) by a user by selecting proper choices on a list of menus presented on a display screen and entering the data to be stored in the transponders. These units are referred to as encoders. The transponders and encoders are designed to communicate data with each other through radio link the signals being encoded digitally for error free transmission and reception. The system further consists of a hand held or fixed location unit to interrogate through a radio link a single or plurality of transponders in an accident or normal commerce situation from a safe distance (of the order of 500 meters), using a two key binary search algorithm. This unit is referred to as the interrogator. The information retrieved from the transponders on the containers is then presented on a display screen. The type of information to be displayed will be chosen by the user by invoking various menu options on the interrogator screen. The system in addition consists of a facility in the interrogator to pin point the direction of any desired tank car in a jumble of tank cars. This direction finding capability is established using a radio link between the interrogator and the desired tank car and utilizing the principles of triangulation.

It is an object of this invention to provide such a system in the art of an electronic remote chemical identification system capable of delivering upon demand to emergency response and other authorized personnel important information about the chemical being carried in a particular tank car, tank truck, barge or ship. The types of information of great use to the emergency responders and other personnel are the US DOT/UN chemical identification number, the chemical name, the shipper's or manufacturer's name and emergency contact telephone number, whether the tank is full or empty, and even detailed information on the proper actions to be taken if the chemical is released or is about to be released.

It is another object of this invention to provide a chemical identification system for meeting all standards of identification currently required. A further object of the invention is to facilitate the identification and processing of chemical and other cargo information from containers in normal commerce and transportation in non-accident situations, by authorized personnel or agencies. Further uses to which this system can be applied include automatic classification of tank cars in classification yards, determining the location of tank cars, tank trucks or other vehicles utilizing satellite-mounted interrogators, and taking of surveys of passing trains or truck traffic for statistical or regulatory purposes.

Another object of this invention is to preclude the easy identification of said chemicals and other hazardous or nonhazardous cargo during transport by groups such as terrorists who might have illicit uses for such information.

The system consists of (i) a plurality of transponders, each of which is attached to a vehicle, container, tank car or tank truck, the transponder provided with antennas, radio circuitry to receive and transmit data, CPU, non-volatile memory, decision-making software, battery and battery charging device and circuitry. The transponder is coded, remotely, by the shipper or the manufacturer with information regarding the particular chemical or cargo being transported in the particular tank car or truck, the coding being implemented at the time the container is loaded with the cargo, (ii) a hand-held or other type of encoder unit provided with a display screen, a key board or other data input device through which the data to be sent to the transponder is entered, memory, CPU, decision logic circuitry and software, chemical data base, antennas and radio circuitry for transmitting to and receiving data from a plurality of transponders, battery and battery charging circuitry, and (iii) a hand-held or other type of portable interrogator unit used at an accident scene or in a normal transportation environment, the interrogated having a keyboard for data entry and selection of user-defined options, display screen for display of information retrieved from a single or a plurality of transponders, CPU, memory, logic circuitry and software, antennas and radio communications circuitry for data transmission and reception, battery and battery charging circuitry, direction finding circuitry and gunsight with cross hairs for determining the location and direction of a specified tank car or tank truck. The various operations of the encoder and the interrogator are invoked by the user by choosing the appropriate options on a list of menus displayed on the display screen.

There are principally four (4) phases of operation of the system. In the first phase the transponder is affixed permanently to the tank car, tank truck or the container of interest and encoded with the alphanumeric identification number of the container. The imprinting of the identification number of the container or the tank car is achieved with a direct cable hook-up between the transponder and the encoder unit to prevent accidental or unauthorized changing of the container identification number imprinted on the transponder memory. The use of the cable does not preclude the transfer of the container identification number through radio communication between a specific transponder and the encoder, using a system of pass words to prevent unauthorized changing of the data in the transponder. The container identification number and the factory-encoded transponder serial number are permanently stored in the transponder memory.

The second phase of operation of the system occurs at the chemical or cargo loading station. In this phase the identification number of the container to which the data are to be transmitted is first entered on the hand-held or other type of encoder unit. This operation is followed by the input into the encoder of the chemical information and other data to be transmitted to the transponder attached to the container and to be stored in the transponder memory. Appropriate error-checking algorithms and schemes are used to ensure that the data transmitted by the encoder and that stored in the transponder memory are one and the same.

In the third phase, the system is operated from a safe distance (about 500 meters) from an accident site involving one or more tank cars, trucks or chemical containers. The interrogator unit commands the transponders attached to the containers to respond to specific questions from the interrogator. Using a system of hierarchy of chemical hazard classes and binary search algorithms with the transponder serial number as another key, the interrogator retrieves data stored in all transponders individually. A number of cars (as high as 100 or more) can be thus polled to identify the cargo contents of each of the different containers. The interrogator then displays such summary data on its display screen as the number of cars in each of the chemical hazard categories. The user can then select, by invoking many options in the command menus presented on the screen, to see additional information on any one tank car or a set of tank cars carrying a specific class of chemical.

The same procedure is also utilized in normal transport to inventory the rolling stock or the tank cars in a train in a classification yard. The distance between the interrogator and the transponders can be as close as a few meters or as far away as over 500 meters.

The fourth phase of operation of the system involves the determination of the direction of a particular and specified tank car or tank truck. The user enters the identification number of the tank car to be located. Information already retrieved by the interrogator from the transponder of the tank car, in phase three operation, is available to the user on the screen of the interrogator. The transponder of the tank car is, therefore, uniquely addressable. The user selects the range/direction find option on the menu presented on the screen of the interrogator. This selection energizes a range determination circuitry on the interrogator. The user then moves the interrogator a specific distance from the current location, inputs the exact distance moved into the interrogator and again invokes the range find option on the menu. The system determines the range to the tank car of interest and calculates the angular bearing of the tank car relative to the line of movement of the user. These values are presented to the user on the screen. The user first aligns the gunsight along the line of motion of the user and then turns the line of gunsight towards the accident scene by the angle displayed on the screen. The new line of sight then gives the direction of the tank car of interest from the current position of the user.

Appropriate emergency actions to take for a particular chemical can also reviewed by the user on the interrogator screen by viewing the information retrieved by the interrogator from the transponder attached to the chemical container, provided that this information was coded on to the transponder at the time of loading of the chemical into the container.

BRIEF DESCRIPTION OF THE DRAWINGS

A preferred embodiment of an identification system according to the invention will now be described with reference to the accompanying drawings wherein:

FIG. 5 is the power-up panel displayed on the encoder-transponder combined unit.

FIG. 6 is the power-up panel display on the encoder.

FIG. 7 is the power-up panel display on the interrogator.

FIG. 8 is the data set communicated by encoder to transponder at chemical loading station.

FIG. 10 is the organization of the chemical database in the encoder/interrogator.

FIG. 12 is the command table.

FIG. 15 is a listing of the U.S. DOT's chemical hazard classes.

DETAILED DESCRIPTION OF THE PREFERRED EMBODIMENT

Figure 1:
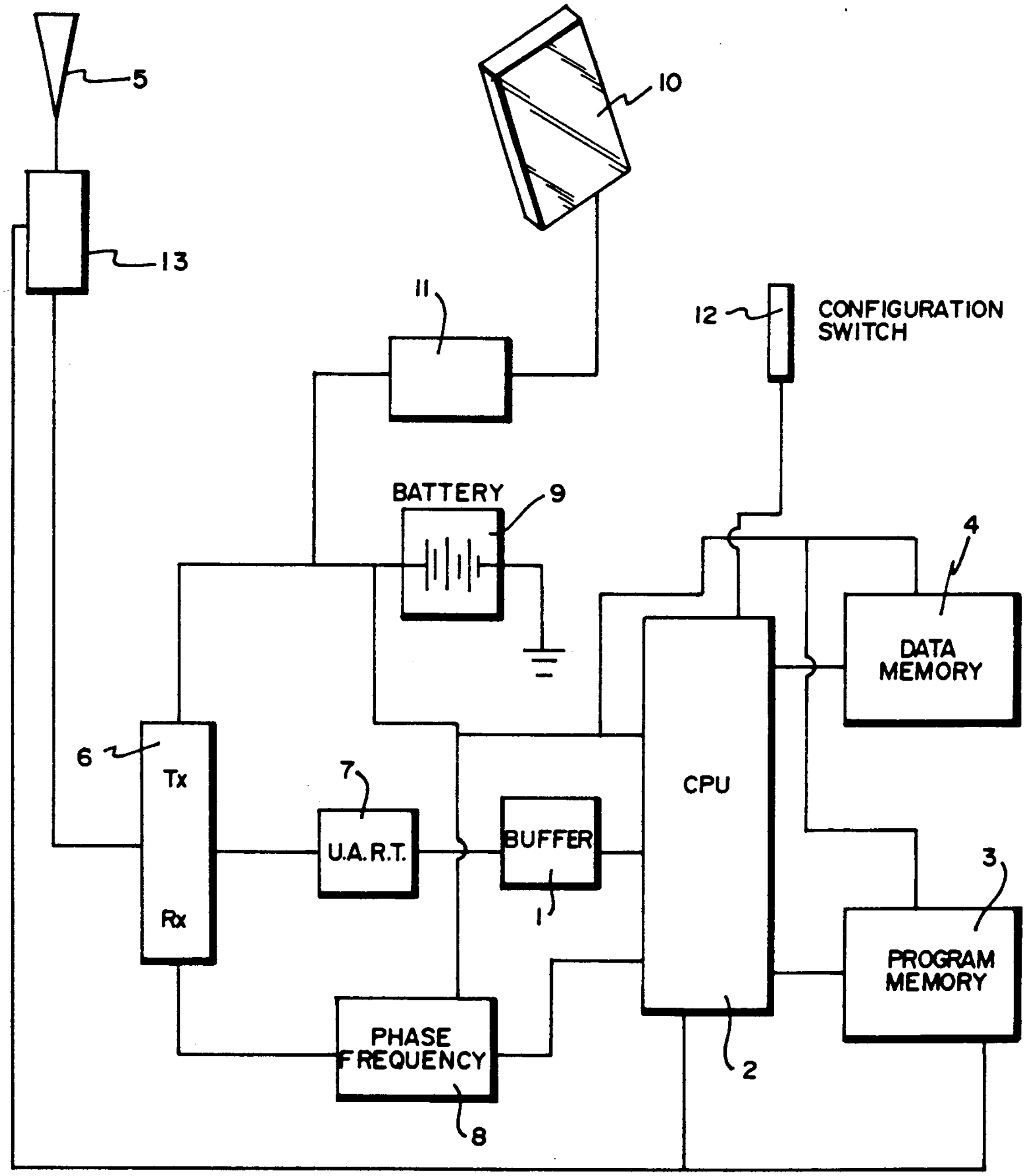
FIG. 1 is a diagram of the transponder components and circuitry.

The principal purpose of the electronic remote chemical identification system is the same as placarding on a hazardous materials car, that is, to provide readily the name of the chemical being transported to emergency response personnel at an accident scene and, likewise, to provide the same information to supervisory personnel during normal, non-accident situations in commerce and trade. This system is, however, based on the principle that a suitably protected transponder can be provided on each tank car or truck containing hazardous materials. This transponder can be electronically programmed with information about the chemical or other cargo being carried in that particular container, tank car, tank truck or partitioned tank, the information being the US DOT or the United Nations chemical number, the chemical name, shipper manufacturer's name, emergency contact telephone number and the name of an individual and any other information of importance. In the case of an accident, the information in the transponder can be retrieved at a safe distance from the accident location by an interrogator. The interrogator commands the transponder by radio signals to respond with the information stored in its memory. The signals received by the interrogator are interpreted and displayed on a small screen such as that of a pocket calculator or a laptop computer. The display will show the chemical name, DOT number, the shipper's name and any other information that may be helpful to the emergency response personnel.

The interrogator can also be used during routine and normal transportation of hazardous materials to query the tank cars or trucks for identification of their contents in transit for inventory or other purposes. In the case of a derailment or road truck accident, police, fire or other emergency responders can use portable interrogators from a safe distance from the accident for quick and positive identification of a chemical.

The electronic remote chemical identification system consists of three principal components: (1) a transponder; (2) the encoder; and (3) the interrogator. The interrogator may be incorporated in the same unit as the encoder. Each tank car or container carrying hazardous chemicals or any other cargo whose identification is necessary is fitted with a transponder.

DESCRIPTION OF THE COMPONENTS OF THE SYSTEM

The transponder is a small microprocessor device powered by rechargeable batteries. The transponder is normally in the receive mode to enable it to receive instructions through radio link. It may be enclosed, except for a small radiating antenna, in a protective box, permanently attached at a convenient and protected location on the tank car, tank truck or a container. The transponder will receive and transmit digitized radio signals on command only from an encoder or an interrogator.

The encoder and interrogator are similar and may vary in size from that of a pocket calculator to that of a lap top computer, with one or more antennas, an alphanumeric keyboard, a display screen and communication ports such as serial or parallel ports to communicate through cables with other devices and a printer.

Referring to FIG. 1 there is shown the preferred embodiment of the components and circuits of the transponder. The transponder comprises a buffer 1, a central processor unit (CPU) 2, non- volatile addressable memory 3 containing the software programs, the transponder serial number and the tank car or container identification number, addressable data memory 4 in which is stored the information input to the transponder regarding the chemical and other data by the user. The transponder, in addition, has one or more radio antennas 5, radio frequency transmitter and receiver circuits 6, a UART chip 7 and range signal frequency shift and phase delay circuit 8. The transmitter/receiver section 6 contains all of the components and circuitry to generate carrier wave signals, modulating circuits, and other components.

The transponder circuits are powered by a rechargeable battery 9. The battery is charged by a charging circuit comprising an external energy collector 10 and the appropriate circuitry 11 to convert the external energy to direct current to charge the battery. In the preferred embodiment the battery charging devices 10 and 11 use a solar collector and associated rectifying circuitry. Nothing in this embodiment is assumed to preclude the use of other well-known technologies for charging batteries, such as the use of wind turbines to tap the wind arising during the motion of the container or tank car, rotation of the tank car wheels converted into electrical power, vibrational energy conversion devices, etc. FIG. 1 also indicates the provision of a configuration switch 12 to code the non-volatile memory 3 with a unique serial number for the transponder, this operation being performed at the time of manufacture of the transponder. An antenna and radio section disable switch 13, similar to a phono plug, is provided. This switch also enables direct access to the non-volatile memory location containing the container or tank car identification number. In the preferred embodiment a shielded cable is connected between the encoder and the transponder through switch 13. The tank car identification number is entered into the encoder after selection of the proper menu function on the encoder screen. The tank car identification number is then coded into the transponder permanent memory. This embodiment does not preclude the use of other techniques to code the car identification number in the transponder using the Radio Frequency (RF) link between the encoder and transponder and using a system of passwords in the encoder to ensure that only authorized persons are allowed to change the information in the permanent memory of the transponder.

FIG. 1 also shows a shielded casing 14 in which all electronic components of the transponder are enclosed, except for the antennas, and the external energy collecting device. The enclosure may be vibration protected and fireproofed.

Figure 2A:
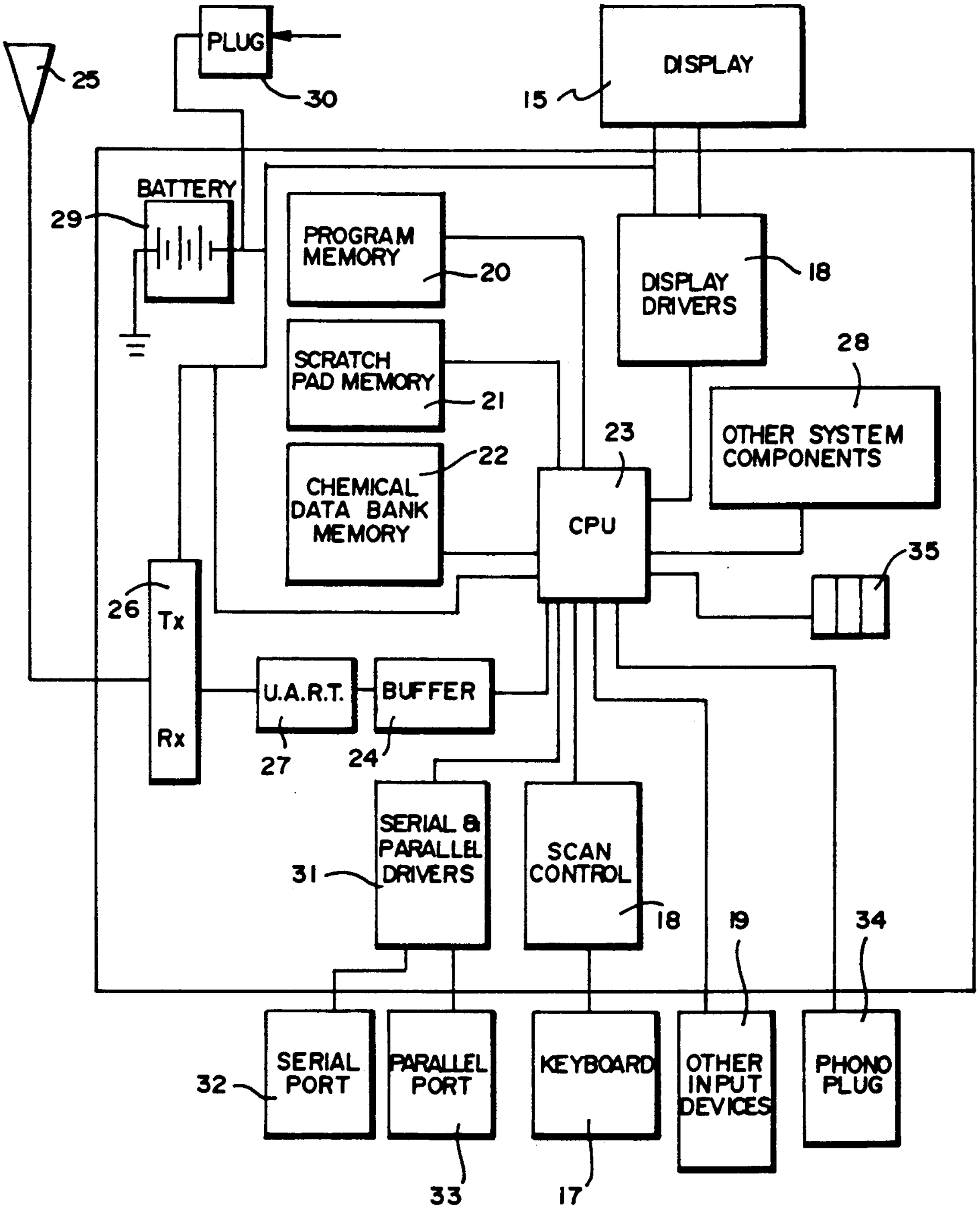
FIG. 2A is the component and circuit diagram of an encoder.
Figure 2B:
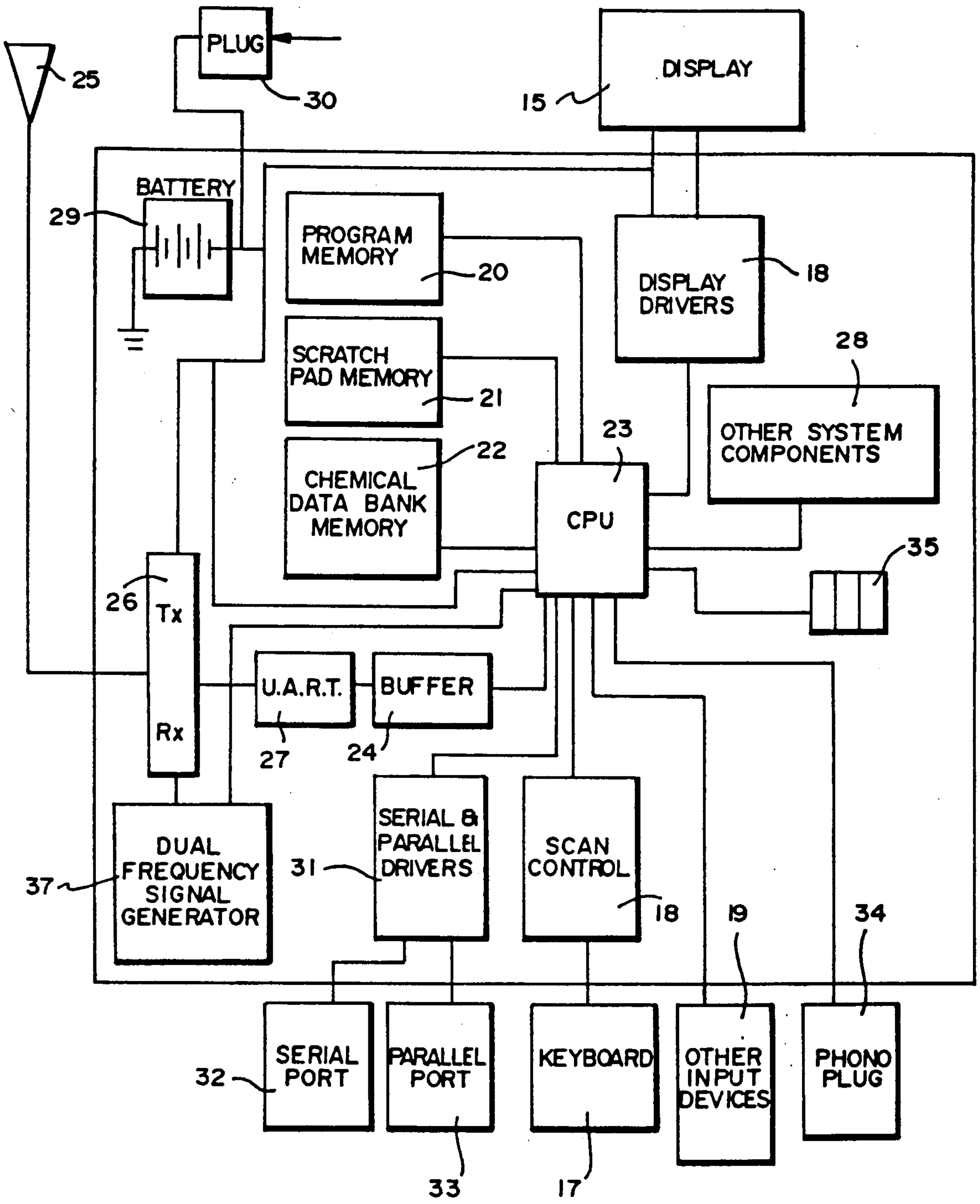
FIG. 2B is the component and circuit diagram of an interrogator.

Referring to FIG. 2 there is shown the components and circuitry of an encoder. The encoder and the interrogator may be placed in the same unit since they will share a substantial part of their functions, components and circuitry. The principal differences lie in the software programs and a few additional components for the interrogator.

A preferred embodiment of the encoder, is indicated in FIG. 2. The encoder consists of an LCD or other type of display 15 with one or more lines of display, the display drive circuits and components 16, an alphanumeric keyboard 17 to facilitate user of information into the encoder and a keyboard scan control circuit 18. The encoder is also provided with a port 19 for connecting, temporarily or permanently, another input device such as magnetic card reader, tape drive, modem, etc., through which data can be entered without having to enter all of the data through the keyboard. The operational functions of the encoder are controlled by the software programs stored in the program read only memory (ROM) 20, and the central processor unit (CPU) 23. A scratch pad memory 21 and a chemical database memory 22 are also shown. Details of normally transported chemicals (about 5000) such as the name of the chemical, the equivalent US DOT/UN number the STCC number, the CAS number, hazard class of the chemical, etc, are stored in this directory. The scratch pad memory 21 serves to store the data input by the user and that retrieved from the transponders. Buffer 24 stores the data transferred between the RF receiver section and the memories and is controlled by the CPU 23. The encoder, in addition, is provided with normal electronic components such as power switch, clock chip, etc. in 28.

The encoder, in addition, consists of one or more antennas 25, an RF transmitter and receiver section 26 and a UART circuit 27. The transmitter and receiver sections contain all circuits and components to generate carrier wave signals, modulate and demodulate the signals and pass the information between the radio section and the digital processor section 23. The carrier wave frequency, bandwidth and power levels are consistent with a 500 meter distance operation and comply with all existing FCC regulations. In the preferred embodiment for digital data transmission a carrier wave frequency of 318 MHz is used. Nothing in this embodiment precludes the use of such other frequencies, power levels and bandwidths that may be appropriate for the effective functioning of the invention. The encoder circuits are powered by a rechargeable battery or battery pack 29. An adapter 30 is also indicated for connecting the battery to a charging unit. The encoder data can be downloaded to a printer through a driver circuit 31 and parallel port 33 or to another communication device through the series driver circuits 31 and the serial port 32. A phono type plug 34 is also provided to facilitate the physical connection of the encoder 35 and the transponder 14 through a shielded cable. This connection 34 is utilized when the transponder is to be coded with the identification number of the tank car to which the transponder is attached.

Another feature of the encoder is the three position switch 35 which enables the unit to act as an encoder only, interrogator only or as both encoder and interrogator. All circuitry and electronic components except for the antennas, keyboard and the various ports are enclosed in shielded casing 36.

Figure 3:
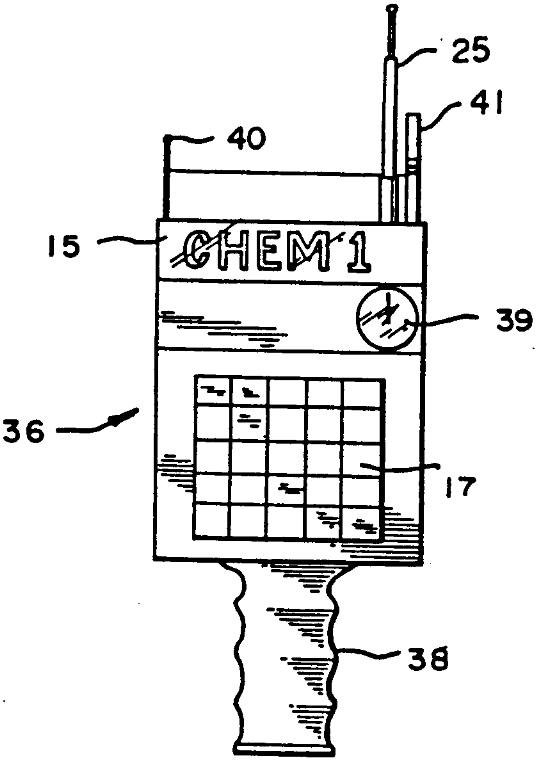
FIG. 3 is a drawing of the hand held interrogator unit.

In FIG. 3 are shown the preferred embodiment of the interrogator circuits and components. The components and circuits for the encoder shown in FIG. 2 also form the essential parts of the interrogator components and circuits. In addition, the interrogator has the circuits, programs and other components to determine the distance range and the direction of a specified tank car. A dual frequency signal generator is indicated in 37. When the range find utility is invoked by the user the dual frequency Tellurometer circuit 37 is energized. Two carrier waves, differing in frequencies slightly, are generated and radiated through the transmitter 26 and antenna 25 to the specific transponder addressed initially by the interrogator. The transponder in turn echoes the carrier waves of the two signals, adds a delay and frequency shift and retransmits the signals back to the interrogator. The interrogator receives the retransmitted signals through the antenna 25, receiver 26 and the information received is processed by the CPU. By comparing the phase of the outgoing signals and that of the signals retransmitted by the transponder and received by the interrogator the distance range between the interrogator and the transponder is determined. The same technique is repeated at another location of the same interrogator with a known distance from the original location. Using the principles of simple trigonometry the bearing angle of the tank car of interest is calculated and presented on the interrogator screen 15.

In the preferred embodiment for the determination of the range and direction of a specified tank car, the well known concept of Tellurometry (Reference: Skolnik, M. I.; Introduction to Radar Systems, New York, McGraw Hill, 1980) is proposed to be utilized. Nothing in this embodiment precludes the use of other range determination techniques based on ultrasonics, directional antenna, other types of radar approaches, laser beams, etc.

Figure 4:
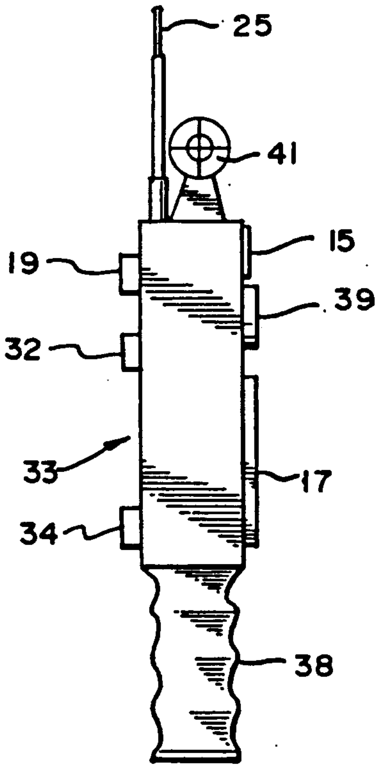
FIG. 4 is the side view of the interrogator unit.

The external features of the interrogator are indicated in FIG. 4A. In the preferred embodiment the interrogator 36 is a hand held unit. The external features of the interrogator consist of the display screen 15, keyboard 17, handle 38, compass 39, gun sight 40 and cross hairs 41. The preferred embodiment for the external features of the encoder are also the same as in FIG. 4A. In FIG. 4B the side view of the external features of the interrogator are shown including the external input device port 19, parallel port 33, serial port 32, and the phono plug 34 for connecting the cable between the interrogator and a transponder. In case the unit is to be used exclusively and only as an encoder, the compass 39, the gunsight 40 and the cross hairs 41 may be absent. Nothing in this embodiment precludes the use of a laptop computer-size interrogator or encoder nor does it preclude the use of spatially fixed units performing essentially the same functions as the mobile hand-held units.

DESCRIPTION OF THE OPERATION OF THE DEVICES

When the combined encoder-interrogator unit 36 is turned on, a selection menu as shown in FIG. 5 is displayed on the screen. To operate the unit as an encoder the user selects option 1 and to operate as an interrogator the user selects option 2. The pressing of any key on the keyboard 17 results in the key scan control 18 determining what key was pressed. This information is passed on to the CPU 23 which initiates the execution of the appropriate software stored in the program memory 20.

When the encoder mode of operation (option 1) is chosen the next panel displayed is shown in FIG. 6. The encoder has three different modes of operation as indicated by the menu options on FIG. 6. If the interrogator option 2 is chosen, in FIG. 5, a panel as shown in FIG. 7 is displayed with two modes of interrogator operation. In case the unit is set by switch 35 to operate only as an encoder, then at power-up the panel in FIG. 6 is displayed. Similarly, if switch 35 is set to interrogator operation only, then at power-up of the unit the panel in FIG. 7 is displayed.

ENCODER MODE OF OPERATION

INITIAL SET UP OF TRANSPONDER

To imprint the identification number of the tank car or container to which a given transponder is attached, first a cable is attached between the transponder at plug 13 and the encoder unit at plug 34. Option 3 on the display panel(FIG. 6) of the encoder is selected. The encoder prompts the user to input through the keyboard 17 the alphanumeric characters indicating the container or tank car identification number. In the preferred embodiment it is proposed that the field width of this character string for the identification number be 30 characters wide and accept any combination of alphabetical, mathematical and numerical characters. This data is converted to ASCII characters bits by the CPU 23 and is transferred through plug 34, through the cable, through the phono plug 13 of the transponder and stored in the permanent memory 3 of the transponder. The transponder CPU 2 then retransmits the same data back through the cable to the encoder for confirmation. The encoder CPU 23 checks the input data stored in the buffer 24 and the confirmation data received from the transponder 14. If there is character by character match between the user input data and the data stored by the transponder a confirmation of the proper imprinting of the vehicle identification number is displayed to the user on the display screen 17 of the encoder. The vehicle identification number imprinted is also displayed. The user is then given the option to modify the data on the tank car number, if he chooses. Once the imprinting is successful the cable connection between the transponder and the encoder is disconnected.

INITIAL SETUP OF THE ENCODER

In the preferred embodiment, the types of data to be transmitted to a specific transponder attached to a tank car or container which is being loaded with a chemical or a cargo are indicated in FIG. 8. This list of data to be stored in the transponder memory for later retrieval is not to be construed as complete and nothing in the embodiment is to preclude the expansion of the size of the list or the parameters in the list. Two principal options are available to the user for entering the data into the encoder and transmitting these data to the transponders.

In the first option, some of the data in the list indicated in FIG. 8 is pre-entered through the keyboard 17 into the encoder 36 for storing permanently. That is, the encoder can be set up initially to store certain common data that will be transmitted to all transponders. This is performed by selecting menu option 2, "common data encoding" on the panel shown in FIG. 6. In this operation those data that are common to, say, a terminal or a loading dock are pre-stored in the particular encoder used in that terminal. Facility is provided in the encoder software so that common data encoding is performed only by authorized personnel. Access to changing these data are executed only with a valid password. The remainder of the data from the list of FIG. 8 are entered individually through the keyboard 17 of the encoder 36 during the time a specific tank car is being loaded. These remainder data may be specific to that tank car, such as the chemical loaded or the name or ID#of the person performing the loading operation at the terminal. At the time the data are transmitted to the transponder, those parameters of the data list shown in FIG. 8 that are stored permanently and those items that are entered each time a transponder is being addressed are together transmitted to the said transponder.

In the second option, all of the data are manually entered through the keyboard 17 of the encoder 36 at the time the transponder on a specific tank car is being loaded with information regarding the contents of that tank car.

TRANSMISSION OF CHEMICAL AND OTHER DATA TO THE TRANSPONDER

Figure 9:
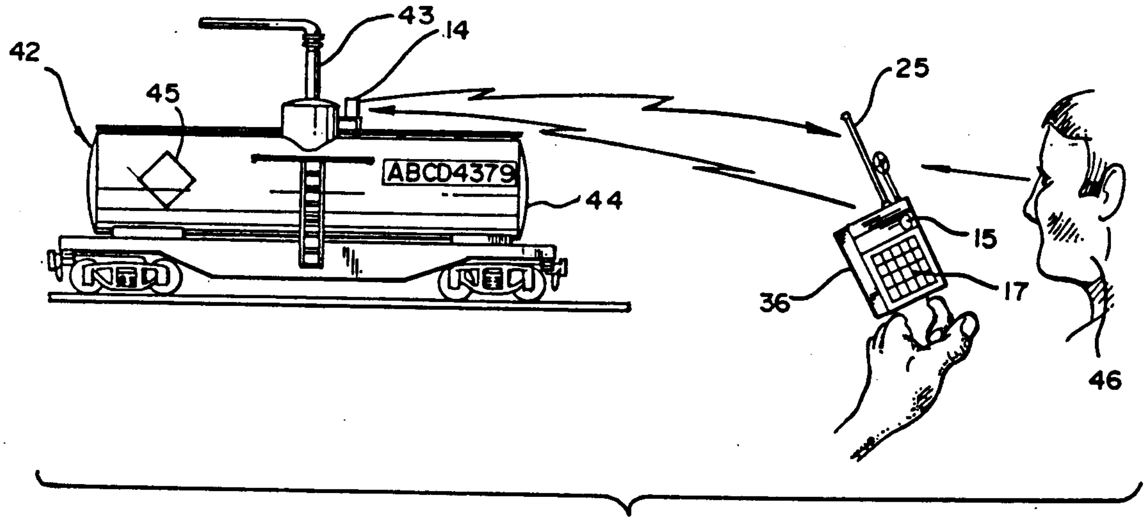
FIG. 9 is a description of the encoding chemical data onto a transponder at a loading facility.

In FIG. 9 is shown the essentials of the operation at a chemical or cargo loading terminal. The operation involves the transfer of all relevant information to the specific transponder attached to a tank car regarding the chemical, or the cargo being carried in the tank car. The information transfer is through the radio link from a relatively remote location from where the tank car is being loaded.

FIG. 9 shows the tank car 42 being loaded with a chemical through a fill pipe 43. The tank car identification number 44 is painted on the car. The tank car also carries a DOT placard 45 indicating the nature of the chemical. A transponder 14 is shown attached to the tank car. This transponder is imprinted previously with the tank car number at the time of attachment to the particular tank car. The terminal foreman 46 holds in his hand the encoder 36. The distance between the foreman and the tank car may be a few meters or can be tens of meters. After switching on the encoder the foreman selects option 1 on the menu indicated in FIG. 6. The encoder prompts the input of the tank car number to which the information is to be transmitted. Further prompts on the screen for data input are limited to those items of data on the list in FIG. 8 that have not been previously stored under the "common data encoding" operation (menu option 2 of FIG. 6). The chemical itself is specified by the foreman by entering either the full chemical name, or the US DOT/UN number or the STCC number or a CAS number. All of the data entered are stored by the encoder on the scratch pad memory 21.

The first operation performed by the CPU 23 of the encoder after all of the data are entered by the foreman is to compare the chemical specification with the detailed chemical directory/data base stored in memory 22. Irrespective of how the foreman has specified the chemical (i.e., by name, or any one of the identifying numbers), the CPU compares it with the data in the chemical data base, a sample of which is shown in FIG. 10. The CPU 23 then extracts from the chemical data base of FIG. 10 located in memory 22 those items of chemical data indicated in FIG. 8 for transmission to the transponder. Also, the CPU 23 retrieves the pre-stored "Common Data" and the date and time from the clock chip and the encoder serial number from the permanent memory 20 and organizes these data in the buffer 24 in the proper order for transmission to the transponder on the tank car specified by the user. The information to be transmitted is organized into a digital bit stream in the UART 27 and loaded onto the transmitter 26. This bit stream is transmitted out of the antenna 25.

ORGANIZATION OF DIGITAL BIT STREAM AND COMMANDS

Figure 11:
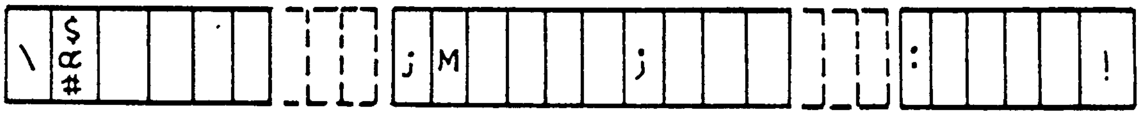
FIG. 11 is the information packaging in the data bit stream.

The transponder 14 is generally in power-down condition but always in the receive mode. The transmission and reception of data between the encoder/interrogator and transponders are in full duplex mode. In the preferred embodiment, the digital data are organized into bytes of 8 binary bits each, with each character being transmitted as its equivalent ASCII number. The transmission of data is proposed at 4800 Baud. A typical bit stream is indicated in FIG. 11. The bit stream consists of a leading delimiter packet header (a "/") character followed by a command character. This command character instructs the transponder to perform specified operations. In FIG. 12 are indicated the various command characters and the transponder action to be performed associated with each of the command characters. Also indicated in FIG. 12 is the format of the bit stream associated with each command to be executed. In general the command character in the bit stream is followed by the tank car number being addressed. The tank car ID number is delimited by a ";" character at the end to signify the end of tank car number sequence. Note that the tank car number can be a combination of numerical and alpha characters and, therefore, the word length is a variable. This is followed by one or more sets of data characters. For example, a "$" commands the transponder to receive and store a particular type of data. The bit stream in this case consists of the leading delimiter, the "$" command character, the tank car number, the ";" tank car number delimiter, the item type character (A through L), the item type delimiter character ";", data content of the item (item string). The various data item types are indicated in FIG. 12. These range from A though L. The data stream is then terminated with a carriage return (<CR>) character signifying the end of data. Following the data delimiter character, Circular Redundancy Check (CRC) or parity check characters are appended. The entire packet is delimited at the end by a tailing delimiter in the form of an exclamation character (a "!"). All characters are encoded as their equivalent ASCII values and each character occupies one byte. The word length of the information stream is variable depending on the length of information to be transmitted. Nothing in the embodiment precludes the use of fixed word lengths for each data field or for the entire information packet.

TRANSPONDER OPERATIONS

All transponders within the radio range of the encoder receive the bit stream radiated by an encoder, through the antenna 5, RF receiver 6, through the UART 7. The serial bits are converted to parallel data by the UART and stored in the buffer which spill over to a temporary memory forming part of the data memory 4. The CPU 2 continually polls this temporary memory area to determine whether any valid command has been received. On receiving a valid command comparison is made with a command table and executes the proper software routines to perform the required action. FIG. 12 indicates the preferred embodiment of a command table resident in the transponder memory 3. The table indicates the correspondence between the command character received in the bit stream and the action to be initiated by the transponder CPU 2. Nothing in the embodiment precludes the expansion of the command table to include additional commands or functions.

Figure 13:
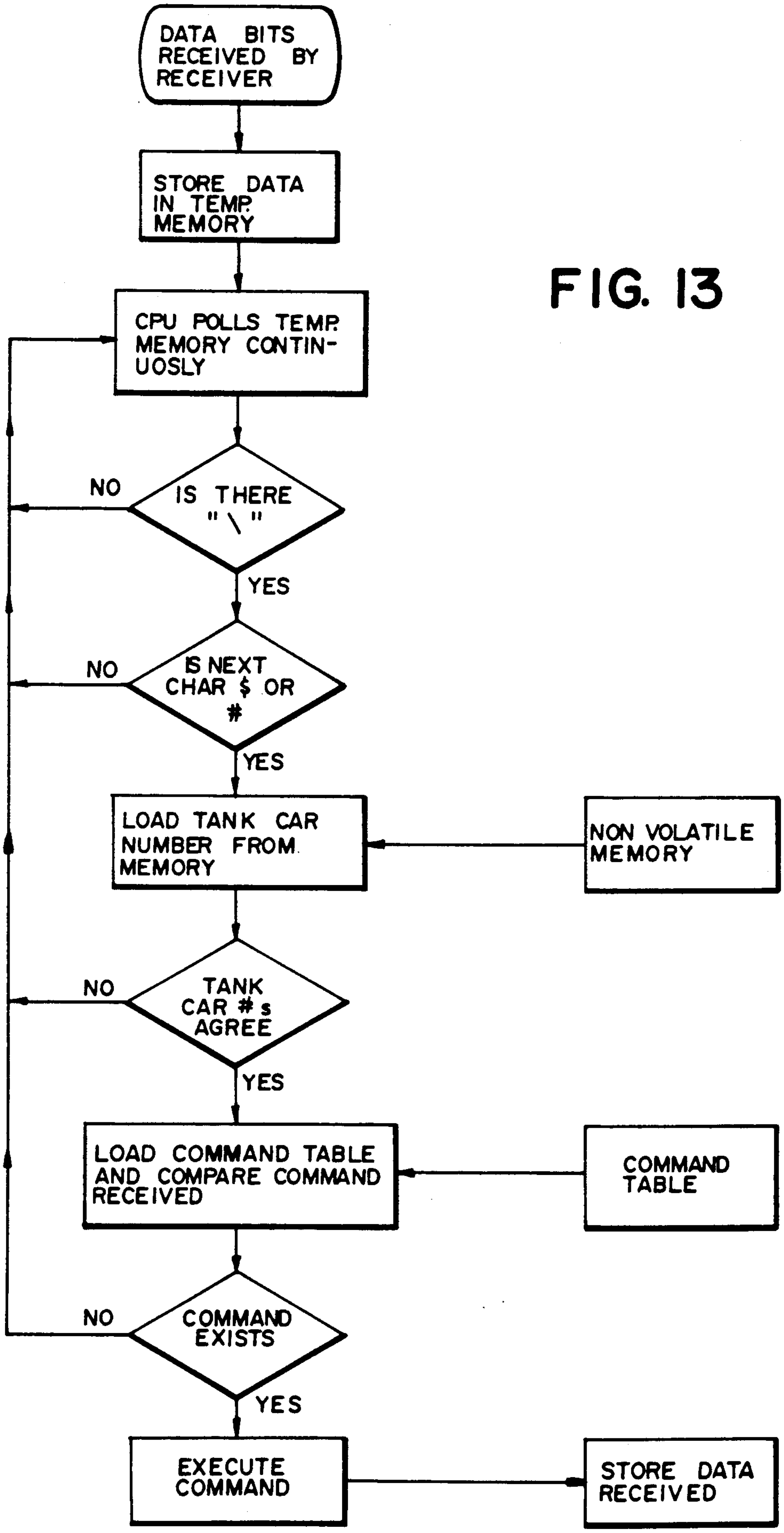
FIG. 13 is the transponder data storage logic diagram.

In FIG. 13 is illustrated the logic diagram for the storage of data transmitted by the encoder at the chemical loading facility into the transponder memory. The CPU first looks for the presence of "/" character. Only if "/" is found is the next character checked against the list of command characters indicted in the command table of FIG. 12. If the received character is a valid command character then the appropriate software program is executed. The program then compares the subsequent characters received with the proper sequence of data according to the format associated with the particular command (see FIG. 12). For example, if the command character is a "$", then the CPU loads the Tank Car identification number resident on the transponder memory 3 into a register and compares this number with the number received from the bit stream following the command character. Only when there is a character by character match in the tank car ID numbers resident and received is the remainder of the bit stream processed. The transponder is also programmed to respond when the tank car ID number received is a zero character. If the tank car ID number received in the bit stream is neither a zero nor the same value as the number resident in the memory, the CPU 2 goes into its default mode of polling the temporary memory space. On the other hand if the tank car ID numbers match, then the next character is interpreted as the data item type. The information content in the characters in the bit stream following the data item type character is then placed at the proper location, for that particular data type, in the transponder memory 4.

In the encoding operation the encoder first sends a "$" command and then each data indicated in FIG. 8 to a particular transponder identified by the ID number of the tank car to which the said transponder is attached. Subsequent to this the encoder sends a command to the same transponder to transmit back the data just received by it and stored. This is done by a "#" command. The transponder encodes the data in the same manner as indicated in FIG. 11. The serial bit stream signals received at the antenna 25 of the encoder 36 are captured by the receiver 26 and passed to the UART 27 which in turn checks for parity and CRC error. If the parity and CRC codes indicate no errors the UART converts the serial data stream into a parallel data stream and loads the buffer 24. The encoder CPU 23 then checks for a match, character by character between the data it sent out to the transponder and the data it received from the same transponder. If a match does not occur for each character then a re transmission of the entire data is initiated.

During the data encoding process each data item indicated in FIG. 8 is first transmitted by the encoder to the particular transponder and immediately confirmed that the particular data was indeed correctly encoded.

INTERROGATION MODE OF OPERATION

Figure 14:
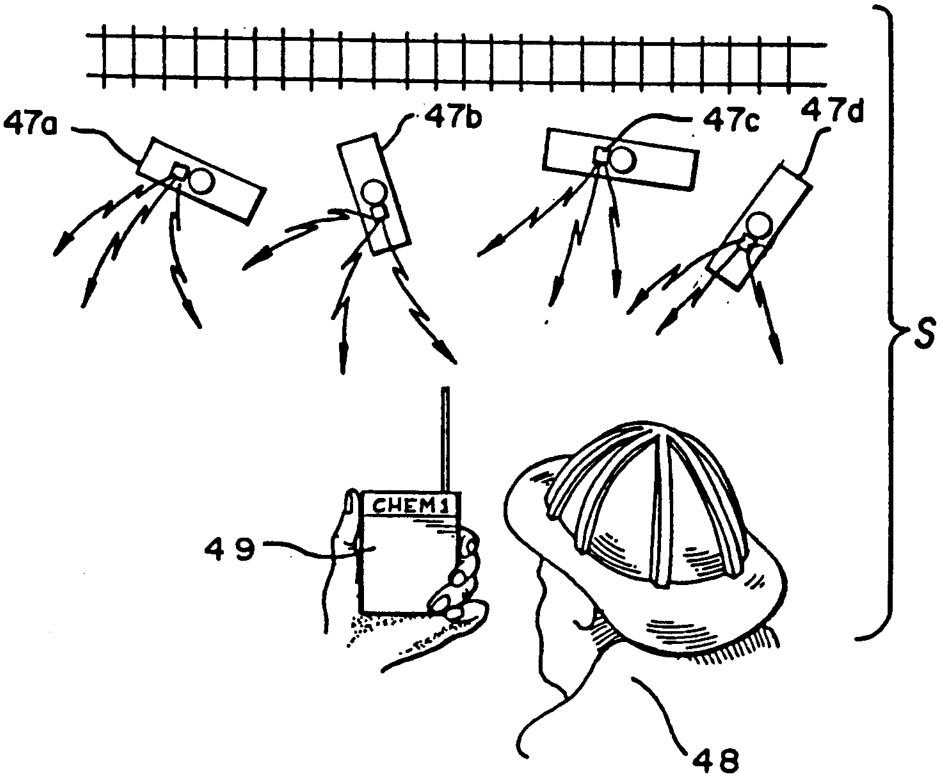
FIG. 14 is a diagram of the determination of the chemical contents of tank cars at an accident scene.

The operation of the electronic remote chemical identification system at an accident site involves the use of the hand-held interrogator. Referring to FIG. 14, there is shown a railroad accident involving a plurality of derailed tank cars 47*a*, 47*b*, 47*c*, etc. The cars are assumed to be lying in all orientations and order compared to the order in the un-derailed train. The emergency response person 48 holds the interrogator 49 in his hand and is at a safe distance S from the derailed tank cars. This distance can be up to 500 meters. At this stage neither the number of tank cars in the train nor the contents of each of the tank cars is known.

When the interrogator 49 is turned on, the operational choices indicated in FIG. 7 are displayed on the interrogator screen 15. To determine the chemical or cargo content of all the cars in the accident, the emergency response person 48 presses the numeric key 1 on the interrogator keyboard 17. The determinations of both the number of tank cars involved in the accident and their chemical contents are performed by using both the hazard class of the chemical and the unique transponder serial number as the two keys.

The US DOT has classified the hazardous chemicals according to a system of classes of hazards posed by the chemicals (Refer 49 CFR, section 173.2, para A, p.337, 1982). FIG. 15 indicates the various hazard classes, their abbreviations and the ranking of the hazard classes. The determination of the chemical contents of the different tank cars in an accident is achieved using the hazard class of the chemical as one of the search keys. The hazard class of the chemical is automatically loaded into the transponder memory during the data encoding process by the encoder 36 which uses the chemical table shown in FIG. 10 to develop part of the data stream indicated in FIG. 8.

The following sequence of operations takes place between the interrogator and the transponders attached to the vehicles in the accident during the process of determining the chemical contents of the tank cars.

STEP 1: Referring to FIG. 11, the interrogator first transmits a signal with tank car ID number equal to zero and the command being a "?". The use of a tank car ID number of zero implies that all transponders, irrespective of their tank car identification numbers, should respond. The command "?" requires all transponders to transmit the information indicated in FIG. 8 and stored in the respective transponder memory. All transponders within radio range of the interrogator 49 will receive this command. The signal string has in it the command to transmit (the second character of the bit stream, referring to FIG. 11). The transponder CPU 2 interprets the command and executes the appropriate software routines. The first routine will power up the transmitter 6. Then the chemical or cargo specific data are loaded into the buffer 1. These data are converted into the proper serial bit stream by the UART 7 and transmitted by the transmitter 6 through the antenna 5.

STEP 2: The signals transmitted by all transponders are received by interrogator antenna 25 and the receiver 26. This signal is transferred to the UART 27. Because of the simultaneous response from all transponders, the signal received will be garbled and will not have the proper CRC code. The CPU 23 repeats the process of sending the same command signal again to all the transponders. This repeat action is taken to ensure that the data error is not due to extraneous environmental causes. If the CRC does not agree the second time (because of the multiple signal interference) the CPU 23 interprets the nonconforming CRC as due to the presence of more than one tank car responding to the inquiry. The details of this step are shown in the top half of FIG. 16.

Figure 16A:
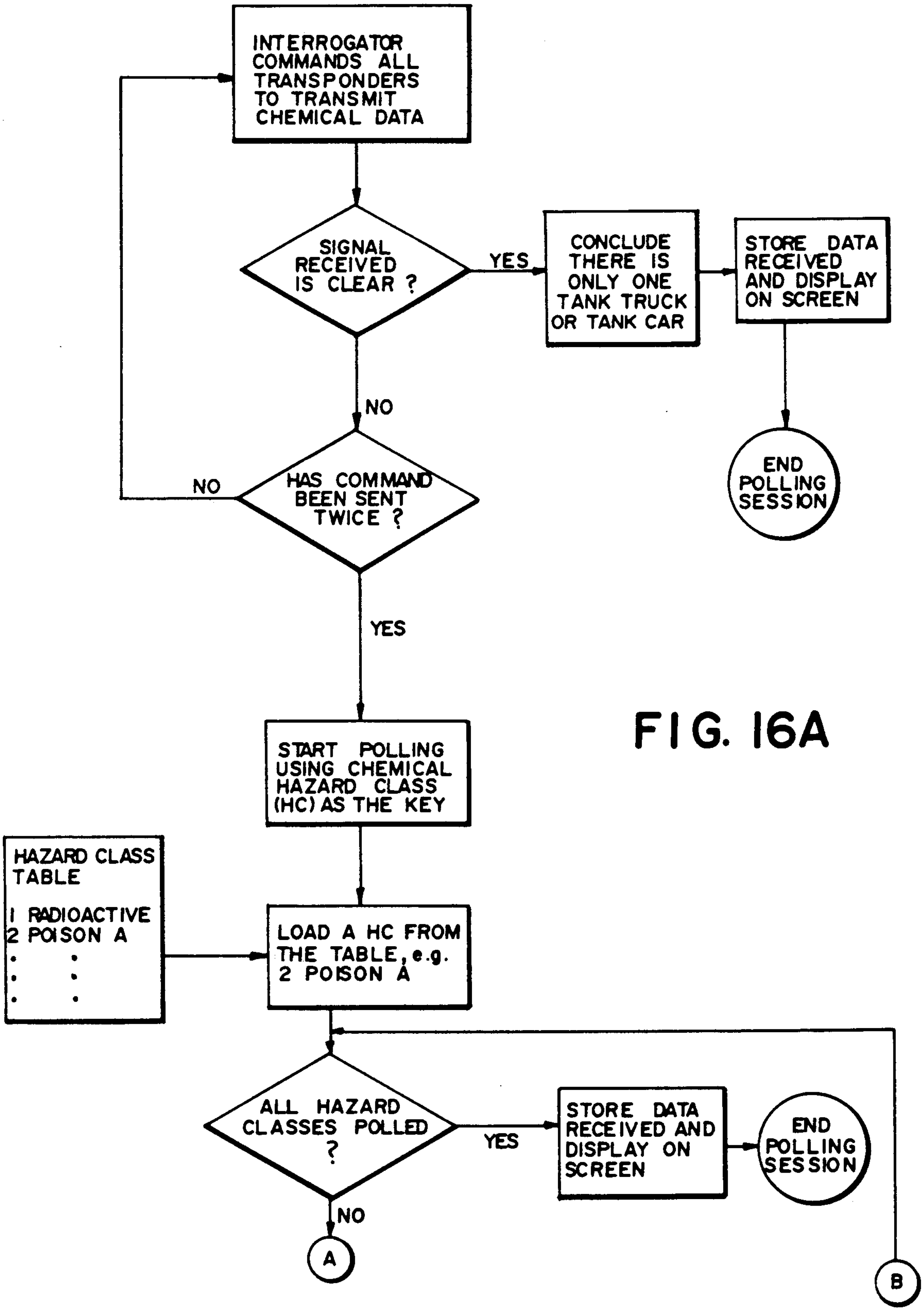
FIGS. 16 A and B are flowcharts of the interrogator polling logic for determining the number of tank cars in an accident and their chemical contents.
Figure 16B:
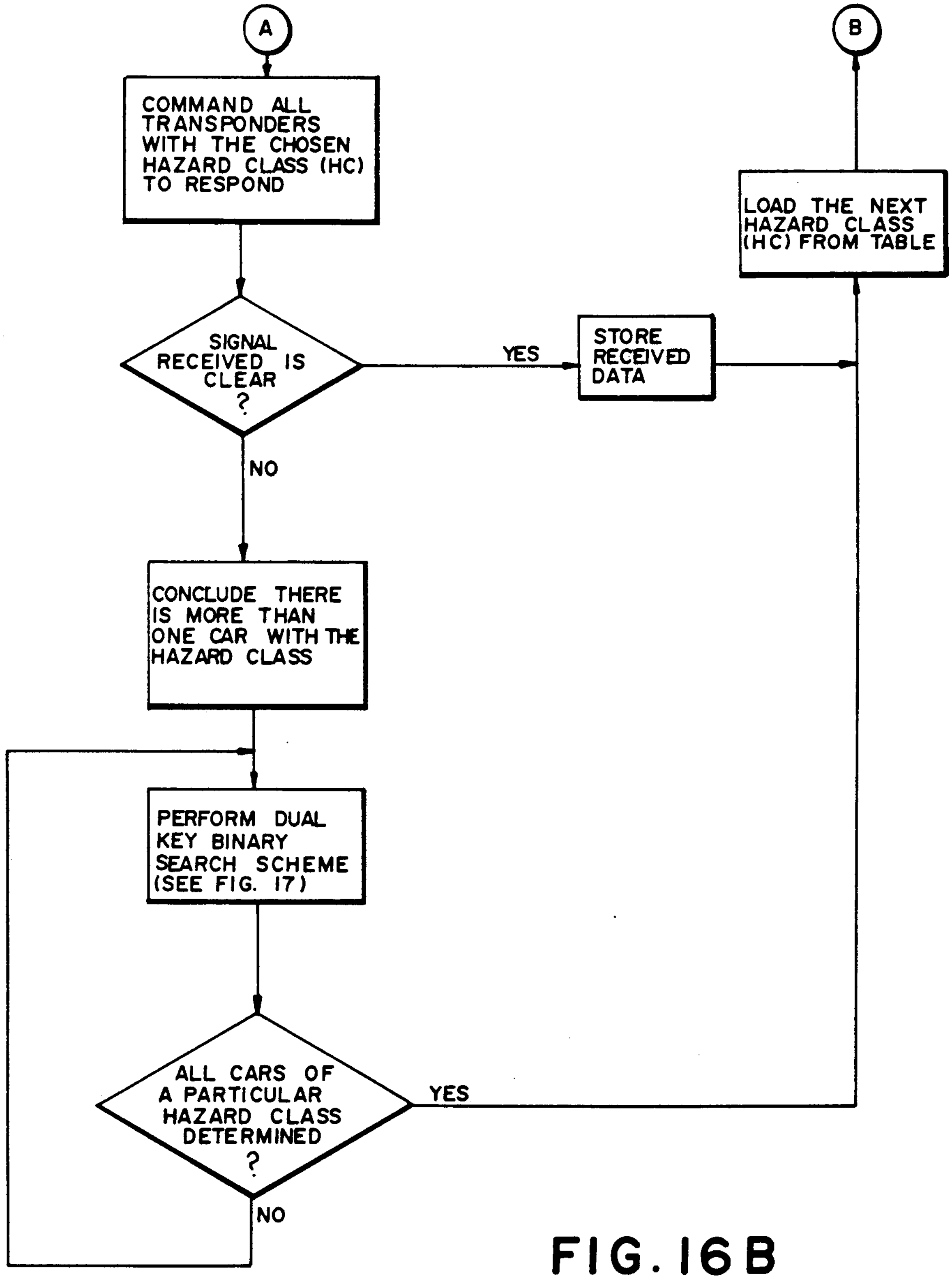

STEP 3: The interrogator now goes into a polling mode using the chemical hazard class as the key for polling. The polling is done in the order of the hazard classes indicated in FIG. 15. Referring to FIG. 16, the interrogator first loads the hazard class of interest from the hazard class table, FIG. 15. The interrogator then commands all transponders with the chosen class of chemicals to respond. The tank car ID number in the bit stream indicated in FIG. 11 will be a zero (all transponders required to respond), and the command character will indicate that comparison has to be made with the hazard class information stored in the transponder memory 4 with the data in the bit stream. All transponders satisfying this criterion will transmit the data content of their respective memories 4. The interrogator receives a garbled data signal.

To prevent environmentally-caused signal errors, the interrogator repeats the question one more time. If the response signal received is again garbled (i.e., the CRC does not tally), the interrogator interprets the result as that there are more than one transponder satisfying the condition. The interrogator starts a polling routine indicated in Step 4 below, using both the hazard class of the chemical and the unique transponder serial number as the search keys. If, on the other hand, a clean signal is received, then there is only one tank car satisfying the condition. The data received from this transponder is then stored in the appropriate location in the interrogator memory 21.

STEP 4: TRANSPONDER POLLING USING DUAL KEY BINARY SEARCH

This search is based on the premise that each transponder has a unique serial number assigned to it during manufacturing, and this serial number can be used as a key for the search. In the preferred embodiment the serial number switch 12 of the transponder is a 32-bit binary switch facilitating the inclusion of transponder serial numbers up to 4,294,967,296.

Figure 17:
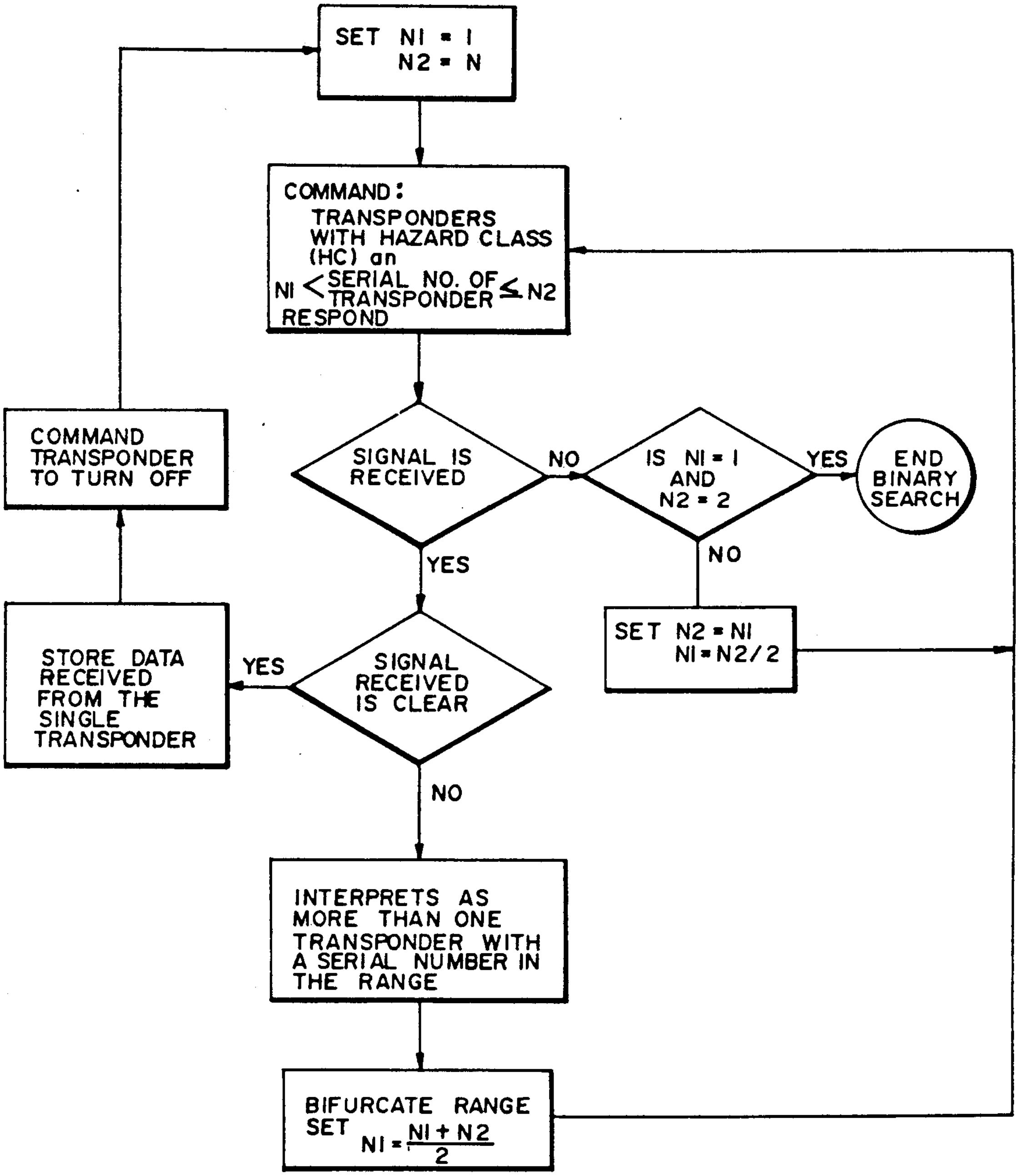
FIG. 17 is a flowchart of the dual key binary search scheme used by the interrogator to determine the contents of tank cars.

FIG. 17 shows the binary search routine in the polling algorithm the interrogator uses to determine the contents of the tank cars. The polling scheme uses the chemical hazard class and the transponder serial number as keys. First, the interrogator CPU sets a range of transponder serial numbers to search. Initially the lower bound of this range is one and the upper bound is the maximum possible serial number. The interrogator loads the chosen hazard class and the lower and upper bound of transponder serial numbers into the transmitter 26 with the appropriate command in the bit stream. This command directs all transponders with the chosen hazard class and whose transponder serial number is within the specified range to transmit the contents of their data memory 4.

Three response cases exist. The first is that the signal received by the interrogator in response to this command is garbled because of responses from a plurality of transponders. The interrogator CPU will interpret the garbled information as multiple responses. Then the existing transponder serial number range is halved; the lower bound serial number is set equal to the average of the existing lower and upper range values. The upper bound is not changed. The command is then transmitted to all transponders with the new serial number range and the same chemical hazard class. Again, one of the three responses is possible.

The second response case is that only one transponder responds to the command. The data received by the interrogator is stored and the search algorithm is restarted using a different hazard class and the same initial value range discussed above. The transponder which responded to the interrogator is turned off by the interrogator until the polling is finished.

The third response case is that no transponder responds to the interrogator command. The interrogator CPU then checks to see if the range of serial numbers being searched is the original range. If it is the original range, all transponders in the hazard class have been isolated and their information loaded into the interrogator CPU. The binary search routine is then terminated and the program control returns to the main polling algorithm code shown in FIG. 16. If there is no response and the range is not the original range, there are still transponders which haven't been isolated. In this case, the range values are reset with the upper value set equal to the current lower value, and the lower value is halved. The new range is transmitted by the interrogator and one of the three responses described occurs.

STEP 5: During the polling of each chemical hazard class an enunciation of the polling in progress is indicated on the interrogator display screen 15. The entire process in step 4 is repeated by the interrogator for all hazard classes indicated in FIG. 15. When the contents of all the tank cars are thus identified and the data retrieved and stored in the interrogator memory, the CPU 23 will collate and present a summary of the data on the interrogator screen 15. The user can then ask to see the data on any tank car by invoking the proper menu choices presented on the screen.

OPERATION OF THE INTERROGATOR TO DETERMINE THE DIRECTION OF A SPECIFIC TANK CAR

When the contents of all tank cars are identified, the user can return to the main interrogator menu as indicated in FIG. 7. By selecting the option 2 on this menu the location of a specific tank car or a tank car with a specified chemical can be determined. This is achieved with the following steps:

STEP 1: Menu option 2 is chosen in FIG. 2. The interrogator screen presents a summary of the information collected from the transponders. This summary is presented in the form of the hazard class and the number of tank cars carrying chemicals of the class. The user then chooses a particular class on the screen menu. More detailed information on the specific chemicals and the number of tank cars of each chemical are presented on the interrogator screen 15. By such a menu-based selection process, the exact tank car whose location is to be determined is chosen.

STEP 2: When the user selects the tank car to be locateds the interrogator CPU 23 sends a signal transmitting a command with the vehicle identification number of the tank car selected by the user. The command will require that only that transponder respond and that it shall turn on its phase & frequency shift circuit 8 and repeat the carrier wave signal that follows. The transponder will then confirm this action back to the interrogator. The interrogator then turns on the dual frequency signal generator 37. These pure tone signals differing slightly in frequency are sent through the interrogator transmitter 26 and antenna 25 to the transponder. The transponder circuit 8 then adds a phase shift to the signals and sends the signals to the transponder transmitter 6 and antenna 5 and retransmits the signal. This repeated signal is received by the interrogator. The interrogator CPU then compares the phase shift in the signal sent originally and the received signal. From this information the distance to the transponder is determined. Any site errors and reflections from nearby objects are discounted using the principles of a dual frequency phase shift algorithm.

Figure 18:
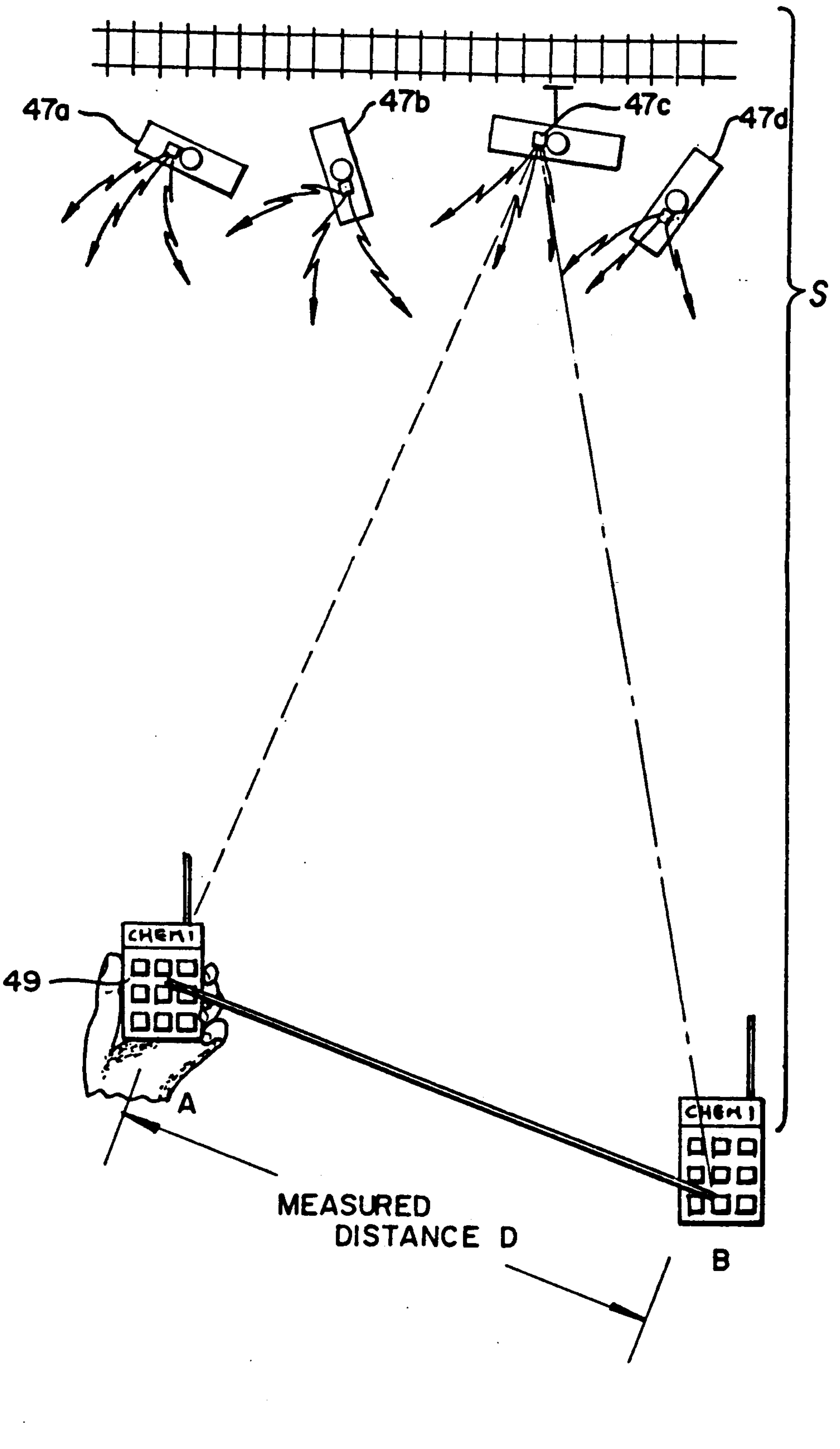
FIG. 18 is a drawing of the determination of the angular bearing of a specified tank car.

STEP 3: The display 15 of the interrogator will now instruct the user to move to a different location whose distance is exactly measured. Referring to FIG. 18, "A" represents the current location of the user holding the interrogator. He moves a certain measured distance to a new location "B". The distance between A and B is entered into the interrogator using the keyboard 17. The user then hits the "ENTER" key on the keyboard 17 in response to a prompt on screen 15. The interrogator repeats all of the operations of STEP 2 and determines the distance between the transponder and the new location of the interrogator.

STEP 4: The CPU 23 of the interrogator now determines the angular bearing between the lines BA and BT, the line of sight between the current position of the interrogator and the tank car of interest. Simple trigonometrical algorithm is exercised to determine this angle knowing the length of the three sides of a triangle. This bearing angle is presented to the user on the display screen 15.

STEP 5: The user now uses the compass 39 on the interrogator to set this bearing angle relative to the direction BA. He looks through the gunsight 40 aligning the cross hairs 41 until the compass reading is exactly equal to the bearing angle indicated on the screen 15. The tank car of interest is thus located in the user's line of sight.

I claim:

1. An electronic remote chemical identification system consisting of a transponder unit for mounting on a container; memory and processor units associated with said transponder unit; said memory unit having both permanent and programmable sections, said permanent section containing a unique transponder identification number; and encoder unit for programming and reprogramming said programmable memory section in said transponder with information relating to the chemical being transported and other data; and an interrogator unit for interrogating said transponder unit to cause said processor units in said transponder to compare the information content of said interrogation with both said data in said permanent memory section and said chemical specific data in said programmable memory section of said transponder and to compile and encode a proper response to said interrogation only if said proper response is appropriate, and to transmit said response compiled from said data in said memories, said interrogator unit being capable of simultaneous communication with a plurality of transponders.

2. An electronic remote chemical identification system as described in claim 1, in which said transponder memory is programmed by said encoder with information relating to said chemical being transported, as well as additional data necessary for appropriate responsive action should an accident occur.

3. An electronic remote chemical identification system as described in claim 1, in which said interrogator unit includes means for decoding and displaying said information for immediate use by emergency response personnel at an accident site, as well as for use by supervisory personnel or control equipment during normal transport of chemicals and other hazardous materials in day-to-day commerce.

4. An electronic remote chemical identification system consisting of a transponder unit for mounting on a container for transporting chemicals or hazardous materials and an interrogator unit which is operable to program a programmable memory in said transponder nit with information relating to the chemical cargo and other data associated therewith, said interrogator unit also being operable to cause said transponder unit to recall said information and other data relating to said chemicals or cargo, and to transmit said data to said interrogator unit, said transponder unit comprised or a battery and associated charging circuit for powering said unit, a non-volatile memory and a programmable memory for storing data relating to the chemical cargo associated therewith, microprocessors for controlling operation of said transponder, a pulse generating circuit for encoding and decoding of said data in said memories, and a radio frequency transmitter and receiver and associated antenna for reception and transmission of said encoded data, and said interrogator unit comprised of a battery for powering said unit, a keyboard for data entry and program control, a display means for displaying of decoded data, a programmable memory and a non-volatile memory for storage of encoded data, microprocessors for controlling operation of said interrogator, a radio frequency transmitter and receiver and associated unidirectional and omnidirectional antennas for reception and transmission of said data, and a sighting device and null meter for determining the direction or location of a signal transmitted from said transponder.

5. An electronic remote chemical identification system as described in claim 4, in which said interrogator unit is operable to program the programmable memory of said transponder unit with data relating to the chemical cargo associated therewith, and said interrogator unit is also operable to cause said transponder unit to code said data relating to said chemical cargo, and transmit said data to said interrogator unit.

6. In an electronic remote chemical identification system as describe in claim 4, said interrogator unit being capable of interrogating a plurality of containers, said containers being either moving or stationary, to uniquely determine the information content of each of said memories of said plurality of transponders associated with said plurality of containers, and storing of said information content in said interrogator memory.

7. An electronic remote chemical identification system as described in claim 6, in which said interrogating process consists of a series of queries and responses between said interrogator and said plurality of transponders.

8. An electronic remote chemical identification system as describe in claim 7, in which said series of queries are arranged to provide an increasing level of uniqueness for identifying said transponders with similar information content, but differing by single or multiple attributes of said information.

9. An electronic remote chemical identification system as described in claim 7, in which said responses by said transponders in response to said queries by said interrogator are determined by the process for the comparison between the stored information content of said transponder memories and said queries received from said interrogator.

10. An electronic remote chemical identification system as described in claim 6, in which said interrogator may communicate with the command responses only from a single one of said plurality of transponders based upon the uniqueness of the information content of said transponder memories.

11. An electronic remote chemical identification system as described in claim 10, in which said interrogator is capable of commanding said single transponder with which said interrogator is in communication to transmit a homing signal, thus allowing determination of an angular bearing of said transponder relative to a reference direction.

* * * * *